Patented Jan. 28, 1947

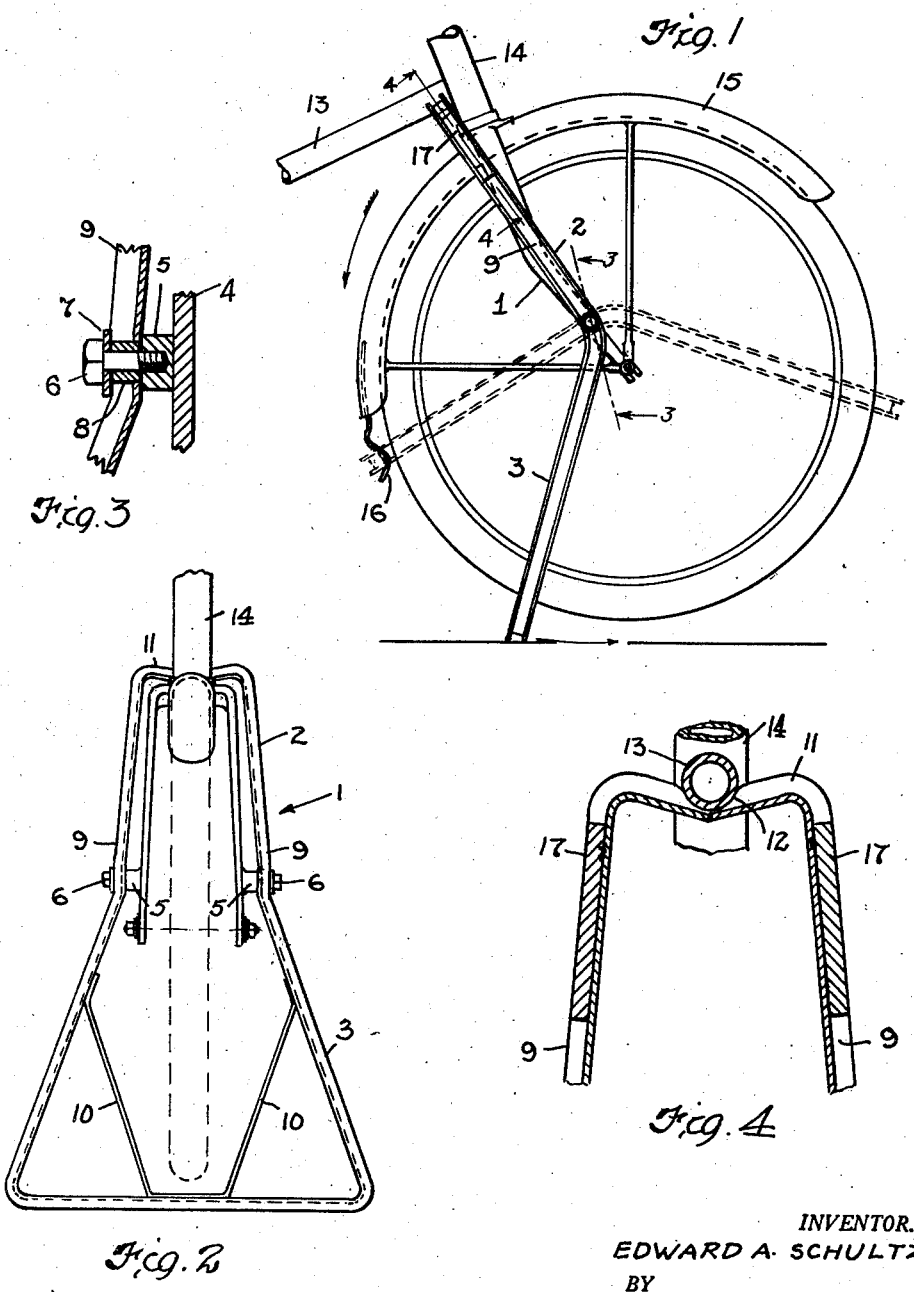

2,414,903

UNITED STATES PATENT OFFICE 2,414,903

BICYCLE STAND

Edward A. Schultz, Cleveland, Ohio, assignor to The Cleveland Welding Company, Cleveland, Ohio, a corporation of Ohio Application September 2, 1943, Serial No. 500,908

4 Claims. (Cl. 280—301)

This invention relates as indicated to bicycles and more particularly to the provision of a front wheel stand for bicycles, whereby when the bicycle is not in use, it may be rigidly and securely supported in an upright position by means of a stand which elevates the front wheel above the ground.

It is a principal object of this invention to provide a structure of the character described which is simple in its construction and accordingly economical of production, while at the same time it is unusually rigid and durable.

It is a further and more particular object of this invention to provide a structure in which the stand when not in use, that is while the bicycle is being ridden, will serve as a guard for the front wheel.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a side elevational view of the front wheel assembly of a bicycle showing a preferred embodiment of my invention in association therewith;

Fig. 2 is a front elevational view of the assembly illustrated in Fig. 1;

Fig. 3 is a fragmentary, sectional view of a portion of the view illustrated in Fig. 1, taken at a plane substantially indicated by the line 3—3; and Fig. 4 is a fragmentary, sectional view of a portion of the structure illustrated in Fig. 1 taken on a plane substantially indicated by the line 4—4.

Referring now more specifically to the drawing and more especially to Fig. 1, the front wheel stand comprising my invention includes a frame generally indicated at 1 having a rearwardly extending portion 2 and a forwardly extending portion 3. The frame 1 is formed of a continuous length of a channel shaped section having the legs turned outwardly and the ends of the section welded together at a suitable point, which may be at any desired place depending on facility of manufacture.

The frame 1 straddles the front wheel and front fork of the bicycle and is pivotally supported at an intermediate area on the front fork, on an arrangement most clearly illustrated in Fig. 3.

Referring now to Fig. 3, each of the forks 4 has a boss 5 secured thereto as by welding. This boss is provided with a threaded hole receiving the screw 6. A washer 7 and a collar 8 are positioned on the screw 6 serving to maintain the side bar 9 of the frame 1 rotatably supported on the bolt 6. Each front fork member 4 is provided with such a connection as most clearly illustrated in Fig. 2.

The point of pivotal connection between the frame 1 and the front fork is, as clearly shown in Figs. 1 and 2, at a distance slightly above the axle of the front wheel. Such location makes possible the employment of a front wheel stand, which, when rotated about its point of pivotal support, may move into its several selected positions, while at the same time clearing the front wheel during such movement and when in the ground engaging position rigidly supports the front end of the bicycle.

The forwardly extending portion 3 of the frame is very substantially wider than the wheel and is cross-braced by means of struts 10.

The rearwardly extending portion 2 of the frame 1 is only slightly narrower than the frame at its point of pivotal support and the flange 11 of that portion of the frame which connects the legs of the rearwardly extending portion is relieved or provided with a notch as at 12 to conform to the lower frame member 13 of the main bicycle frame.

The length of the rearwardly extending portion 2 beyond the point of pivotal support is such that it will pass underneath the lower bar 13 of the main frame and move into engagement with the rear side of the front post 14 of the main frame.

The bicycle is provided with a conventional front mud guard 15 to the rear end of which is secured a bracket 16 having re-bent configuration such as to resiliently secure the front wheel stand in the dotted line position when the bicycle is being ridden.

It may be desirable in certain types of construction to attach counter-weights such as 17 to the opposite legs of the rearwardly extending portion or to provide any other suitable expedient insuring that the weight of the rearwardly extending portion 2 is at least slightly greater than that of the forwardly extending portion 3. When this expedient is employed, it may be possible to omit the catch 16 and to merely provide a stop against which the rearwardly extending portion of the stand may move under the influence of gravity in a counterclockwise direction as viewed in Fig. 1. Even though the clip 16 be retained for the purpose of preventing rattling of the parts during use, the counter-weighted rear end of the frame will insure that, even though the clip may become disengaged, the front end of the stand will never fall to the ground while the bicycle is being ridden.

In my improved construction, the wider front end 3 of the stand which occupies the dotted line position in Fig. 1, while the bicycle is being ridden, provides a very effective bumper preventing injury to the front wheel should the bicycle be ridden against an obstruction. The fact that the rearwardly extending portion 2 is not substantially wider than the front fork, i. e., not substantially wider than the front mud guard, insures that the stand will not interfere with the rider's feet as he is pedaling the bicycle.

The notch 12 in the rear end of the part 2 of the frame by engaging the lower frame member 13 of the bicycle further insures maintaining the frame in a rigid state when it is in ground engaging position and supporting the bicycle.

Numerous other advantages of my improved construction will be apparent to those familiar with the art.

Other modes of applying the principle of the invention may be employed, change being made as regards the details described, provided the features stated in any of the following claims or the equivalent of such be employed.

I therefore particularly point out and distinctly claim as my invention:

1. In a bicycle, a front wheel stand comprising an elongated frame straddling the front wheel, and means for mounting said frame with its center of gravity to the rear of the axis of the front wheel, said means including mounting-pivots on the front fork back of and above the wheel axis, one terminal portion of said frame arranged to alternatively extend forwardly of the front wheel and into engagement with the ground beneath such wheel, and the other terminal portion of said frame being heavier than the said portion.

2. In a bicycle, a front wheel stand comprising an elongated angularly bent frame straddling the front wheel and pivotally suspended on the front fork, one terminal portion of said frame arranged to alternatively extend forwardly of the front wheel and into engagement with the ground beneath such wheel, and the other terminal portion of said frame arranged to alternatively extend rearwardly of the front wheel and into engagement with the frame of the bicycle adjacent to and rearwardly of the front post thereof, that portion of said frame lying rearwardly of its pivotal support being heavier than the forward portion, and means for securing said frame in a substantially horizontal position.

3. In a bicycle, a front wheel stand comprising an elongated frame straddling the front wheel and pivotally secured to the front fork at a point above the front wheel axle, one terminal portion of said frame arranged to alternatively extend forwardly of the front wheel and into engagement with the ground beneath such wheel, and the other terminal portion of said frame arranged to alternatively extend rearwardly of the front wheel and provide bracing means both transversely and in line with the frame by engagement with the frame of the bicycle adjacent to and rearwardly of the front post thereof, that portion of said frame lying rearwardly of its pivotal support being heavier than the forward portion, and means for securing said frame in a substantially horizontal position.

4. In a bicycle having a front mudguard on its front wheel, a front wheel stand comprising an elongated angularly bent frame straddling the front wheel and pivotally suspended on the front fork at a point above the front wheel axle, one terminal portion of said frame arranged to alternatively extend forwardly of the front wheel and into engagement with the ground beneath such wheel, and the other terminal portion of said frame arranged to alternatively extend rearwardly of the front wheel and provide bracing means both transversely and in line with the frame by engagement with the frame of the bicycle adjacent to and rearwardly of the front post thereof, that portion of said frame lying rearwardly of its pivotal support being heavier than the forward portion, and means for securing said frame in a substantially horizontal position, said means comprising a latch on the rear end of the front mudguard adapted to engage said rearwardly extending portion of the frame.

EDWARD A. SCHULTZ.